United States Patent [19]

Stuart

[11] Patent Number: 4,621,978
[45] Date of Patent: Nov. 11, 1986

[54] COUNTERROTATING POWER TURBINE

[75] Inventor: Alan R. Stuart, West Chester, Ohio

[73] Assignee: General Electric Company, Cincinnati, Ohio

[21] Appl. No.: 677,631

[22] Filed: Dec. 3, 1984

[51] Int. Cl.$^4$ .............................................. F01C 1/26
[52] U.S. Cl. .................................. 416/127; 416/128; 416/130; 415/65
[58] Field of Search ............... 416/127, 128, 129, 130, 416/124, 125, 126, 193 R; 60/226.1, 39.162; 415/65, 69, 130

[56] References Cited

U.S. PATENT DOCUMENTS 3,363,419  1/1968  Wilde .................................. 60/226

FOREIGN PATENT DOCUMENTS 2200497  11/1977  Fed. Rep. of Germany ...... 416/129
586570   3/1947   United Kingdom ................ 416/129

Primary Examiner—Leonard E. Smith
Attorney, Agent, or Firm—Douglas S. Foote; Derek P. Lawrence

[57] ABSTRACT

An improved counterrotating power turbine is disclosed. The power turbine includes a support having an annular axial cross-section and forward and aft portions. The forward portion of the support has a diameter greater than the diameter of the aft portion. Also included are a first rotor and a second rotor. The first rotor is supported on the first portion of the support by first bearing means and extends to the aft portion forming a first interface therewith. The second rotor is supported on the first rotor by second bearing means and extends to the aft portion of the support forming a second interface therewith. In this manner, it is possible to have low diameter slip rings at the first and second interfaces while maintaining relative high diameters for the rotor bearing means.

10 Claims, 1 Drawing Figure

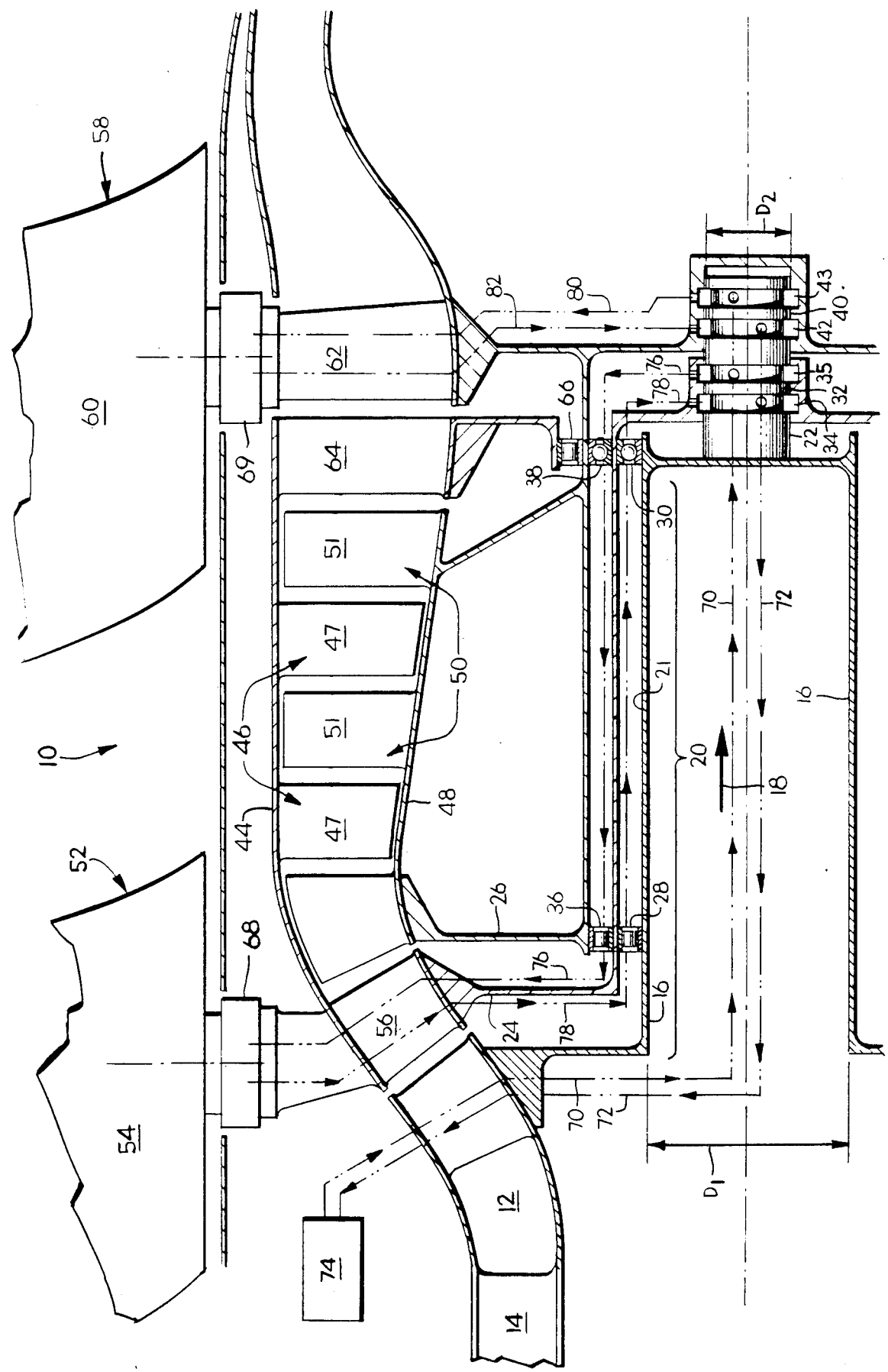

COUNTERROTATING POWER TURBINE

This invention is related to U.S. patent application Ser. No. 437,923—Johnson, filed Nov. 1, 1982, commonly assigned.

This invention relates to gas turbine engines and, more particularly, to a new and improved rotor and bearing configuration for a counterrotating power turbine.

BACKGROUND OF THE INVENTION

Conventional gas turbine engines for powering aircraft include turbofan and turboprop engines. A recent improvement over these engines is the unducted fan engine such as disclosed in the above-referenced application. The engine disclosed therein includes a unique counterrotating power turbine directly coupled to counterrotating unducted fan blades.

It is important to be able to control the pitch of such propulsor blades. An example of an effective pitch control mechanism is disclosed in U.S. patent application Ser. No. 647,283, Wakeman et al. While the blade pitch varying means disclosed therein is highly reliable, it is desired to further reduce the weight and complexity of such mechanisms.

In one form, the present invention contemplates the use of hydraulic fluid to provide power for changing blade pitch. In order to transmit the fluid between the static engine support structure and the power turbine rotors, it is proposed to use slip rings. Efficient operation of such rings requires relatively small diameters. However, the rotors are supported to the static support by bearings which need a relatively large diameter for stable operation.

OBJECTS OF THE INVENTION

It is an object of the present invention to provide a new and improved counterrotating power turbine.

It is another object of the present invention to provide a new and improved rotor and bearing configuration for a counterrotating power turbine.

It is a further object of the present invention to provide new and improved blade pitch varying means for propulsor blades driven by a counterrotating power turbine.

It is yet another object of the present invention to provide a new and improved counterrotating power turbine rotor and bearing configuration which includes a low diameter hydraulic slip ring for transmitting hydraulic fluid to counterrotating propulsor blades.

SUMMARY OF THE INVENTION

The present invention is an improvement for a gas turbine engine comprising a support having an annular axial cross-section and forward and aft portions. The forward portion has a diameter greater than the diameter of the aft portion. The improvement also includes a first and second rotor. The first rotor is supported on the forward portion of the support by first bearing means and extends to the aft portion of the support thereby forming a first interface with the support. The second rotor is supported on the first rotor by second bearing means and extends to the aft portion of the support thereby forming a second interface with the support.

BRIEF DESCRIPTION OF THE DRAWING

The FIGURE is a partial longitudinal schematic view which substantially illustrates a preferred embodiment of the present invention.

DETAILED DESCRIPTION OF THE DRAWING

The FIGURE illustrates a power turbine 10 of a gas turbine engine. Power turbine 10 includes an annular gas flowpath 12 for receiving combustion gases from a gas generator 14.

A static support 16 extends through flowpath 12 and extends generally in an axially aft direction shown by arrow 18. Support 16 includes a forward portion 20 and an aft portion 22. The outer surface 21 of static support 16 may have a variety of shapes. For example, it may contain cylindrical sections or it may be generally frustoconical. However, it will have a substantially annular axial cross-section with forward portion 20 having a diameter $D_1$ greater than the diameter $D_2$ of aft portion 22.

Power turbine 10 includes a first rotor 24 and second rotor 26. First rotor 24 is supported on forward portion 20 of static support 16 by two axially displaced bearings 28 and 30. In the embodiment shown, bearing 28 is a roller-type bearing whereas bearing 30 is a thrust-type bearing. However, many alternative bearing means for supporting first rotor 24 on static support 16 will now occur to those skilled in the art. For example, it may be possible to support first rotor 24 with a single bearing.

First rotor 24 extends to aft portion 22 of support 16 thereby forming a first interface 32 between first rotor 24 and aft portion 22. First interface 32 includes first slip rings 34 and 35 for transmitting power between support 16 and first rotor 24. In a preferred embodiment, slip rings 34 and 35 are effective for transmitting hydraulic fluid therethrough. However, according to an alternative form of the present invention, first interface 32 may include an electrical slip ring.

Second rotor 26 is supported on first rotor 24 by two axially displaced differential bearings 36 and 38. According to a preferred embodiment of the present invention, differential bearing 36 is a roller bearing and differential bearing 38 is a thrust bearing. As with bearings 28 and 30, other bearing configurations are possible. For example, bearings 36 and 38 may be replaced with a single bearing.

Second rotor 26 extends to aft portion 22 of support 16 thereby forming a second interface 40 between support 16 and second rotor 26. Second interface 40 includes second slip rings 42 and 43 for transmitting power between support 16 and second rotor 26. Second interface 40 may be electrical or hydraulic slip rings with the latter being preferred and shown in the FIGURE.

First rotor 24 includes an outer drum member 44 supporting a plurality of first turbine blade rows 46. Each blade row 46 includes inwardly directed turbine blades 47. Second rotor 26 includes an inner drum member 48 supporting a plurality of second turbine blade rows 50. Each of second turbine blade rows 50 is alternately spaced with inner blade rows 46, and includes outwardly directed turbine blades 51. Blade rows 46 and 50 are effective to turn rotors 24 and 26 in counterrotating directions.

A first propulsor blade row 52 is attached to and rotatable with first rotor 24. Blade row 52 includes a plurality of propulsor blades 54. Forces required to support blade row 52 are transmitted through flowpath 12 by first power frame 56. A second propulsor blade row 58 is attached to and rotatable with second rotor 26. Each blade row 58 includes a plurality of second propulsor.blades 60. Forces necessary to support second propulsor blade row 58 through flowpath 12 are transmitted through second power frame 62.

In order to supply support for the aft end of outer drum member 44, a third power frame 64 extending through flowpath 12 is supported on second rotor 26 by first rotor differential bearing 66.

In operation, at least one of first propulsor blades 54 and/or second propulsor blades 60 will have variable pitch. According to the preferred form of the present invention, pitch control will be achieved hydraulically. Conventional hydraulic actuation mechanisms are known in the art and are shown schematically at 68 and 69. In order to transmit hydraulic fluid from support 16 to pitch control mechanism 68, slip rings 34, 35 and/or 42, 43 are provided.

Hydraulic fluid will be supplied to slip rings 34 and 42 by suitable conduits which follow a path in support 16 shown by arrows 70. Slip rings 35 and 43 conduct hydraulic fluid across the stationary/rotating interfaces 32 and 40, respectively. Such fluid thence follows paths shown by arrows 76 and 80 to respective actuation mechanisms 68 and 69. The return conduit from actuation mechanism 68 follow arrows 78 and 72 and passes through slip ring 34, whereas the return from actuation mechanism 69 follows arrows 82 and 72 and passes through slip ring 42. It should be understood that the terms supply and return are used for illustration, but that the flow direction will vary depending upon the required pitch change.

In order to minimize leakage normally associated with hydraulic slip rings, the diameter $D_2$ of such rings is at a greatly reduced level as shown in the FIGURE. In contrast to the low diameter $D_2$ desired for slip rings 34, 35 and 42, 43, a relatively high diameter $D_1$ is desired for bearings 28, 30, 36, 38, and 66. The unique arrangement in the present invention allows $D_2$ and $D_1$ to be selected at optimum values independent of one another.

It will be clear to those skilled in the art that the present invention is not limited to the specific embodiment described and illustrated herein. Nor, is it limited to hydraulic actuation. Rather, it applies equally to electric pitch change mechanisms utilizing electric slip rings. In addition, the invention applies to blade pitch varying means for both fan and propeller blades.

It will be understood that the dimensions and proportional and structural relationships shown in the drawing are by way of example only, and these illustrations are not to be taken as the actual dimensions or proportional structural relationships used in the counterrotating power turbine of the present invention.

Numerous modifications, variations, and full and partial equivalents can be undertaken without departing from the invention as limited only by the spirit and scope of the appended claims.

What is desired to be secured by Letters Patent of the United States is the following.

What is claimed is:

1. An improvement for a gas turbine engine comprising:
    a support having an annular axial cross-section and forward and aft portions, said forward portion having a diameter greater than the diameter of said aft portion;
    a first rotor supported on said first portion by first bearing means and extending to said aft portion and forming a first interface therewith; and
    a second rotor supported on said first rotor by second bearing means and extending to said aft portion and forming a second interface therewith.

2. An improvement, as recited in claim 1, wherein:
    said first bearing means includes two axially displaced bearings; and
    said second bearing means includes two axially displaced differential bearings.

3. An improvement, as recited in claim 2, further comprising:
    a first rotor differential bearing for supporting said first rotor on said second rotor.

4. An improvement, as recited in claim 1, wherein:
    said first rotor includes an outer drum member supporting a plurality of first turbine blade rows with inwardly directed turbine blades;
    said second rotor includes an inner drum member supporting a plurality of second turbine blade rows with outwardly directed turbine blades; and
    said rotors are counterrotatable.

5. An improvement, as recited in claim 4, further comprising:
    a first propulsor blade row rotatable with said first rotor and including a plurality of first propulsor blades; and
    a second propulsor blade row rotatable with said second rotor and including a plurality of second propulsor blades.

6. An improvement, as recited in claim 5, wherein:
    at least one of said first propulsor blades has a variable pitch, and
    said first interface includes a first slip ring for transmitting power between said support and said first rotor for changing the pitch of said first propulsor blade.

7. An improvement, as recited in claim 6, wherein said first slip ring is effective for transmitting hydraulic fluid between said support and said first rotor.

8. An improvement, as recited in claim 5, wherein:
    at least one of said second propulsor blades has a variable pitch; and
    said second interface includes a second slip ring for transmitting power between said support and said second rotor for changing the pitch of said second propulsor blade.

9. An improvement, as recited in claim 8, wherein said second slip ring is effective for transmitting hydraulic fluid between said support and said second rotor.

10. An improvement for a gas turbine engine comprising:
    a support having an annular axial cross-section and forward and aft portions, said forward portion having a diameter greater than the diameter of said aft portion;
    a first rotor supported on said first portion by first bearing means and extending to said aft portion and forming a first interface therewith;
    a second rotor supported on said first rotor by second bearing means and extending to said aft portion and forming a second interface therewith;
    a first propulsor blade row rotatable with said first rotor and including a plurality of first propulsor blades; and a second propulsor blade row rotatable with said second rotor and including a plurality of second propulsor blades; wherein each of said first propulsor blades has a variable pitch, and said first interface includes a first slip ring for transmitting hydraulic fluid between said support and said first rotor for changing the pitch of said first propulsor blades; and each of said second propulsor blades has a variable pitch, and said second interface includes a second slip ring for transmitting hydraulic fluid between said support and said second rotor for changing the pitch of said second propulsor blades.

* * * * *